J. CONNER.
Pipe-Couplings.

No. 136,365. Patented March 4, 1873.

Witnesses
Thomas J. Bewley
Harry C. Binners

Inventor.
Joseph Conner
By His Attorney.
Stephen Ustick

UNITED STATES PATENT OFFICE.

JOSEPH CONNER, OF PHILADELPHIA, PENNSYLVANIA, ASSIGNOR TO HIMSELF AND ISAAC P. WENDELL, OF SAME PLACE.

IMPROVEMENT IN PIPE-COUPLINGS.

Specification forming part of Letters Patent No. 136,365, dated March 4, 1873.

*To all whom it may concern:*

Be it known that I, JOSEPH CONNER, of the city of Philadelphia and State of Pennsylvania, have invented certain Improvements in Pipe-Couplings, of which the following is a specification:

My invention relates to that description of pipe-couplings in which a smooth socket is projected from the female screw of one end of a pipe and fits over the smooth surface of the contiguous end of the connected pipe to prevent the breaking of said pipe at the termination of its screw-thread; and consists in slotting the socket in such a manner as to admit of its yielding as it advances over the smooth surface of the other pipe to any inequalities in the diameter of the same, as hereinafter described.

Figure 2:
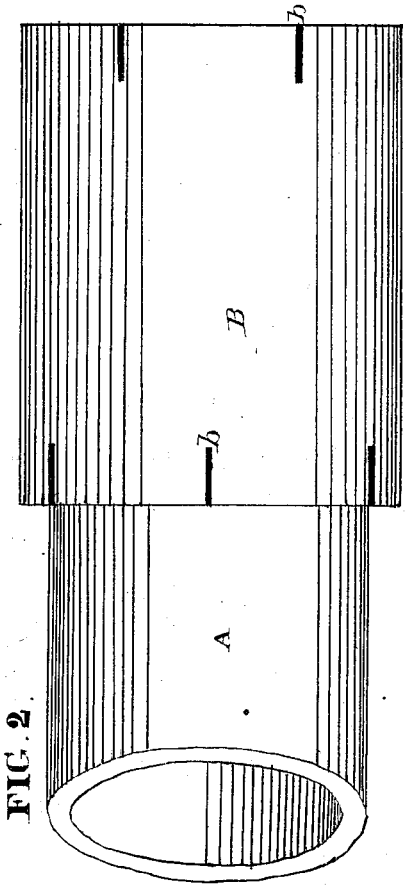
Figure 1:
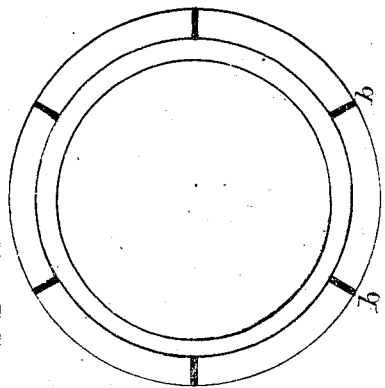
Figure 3:
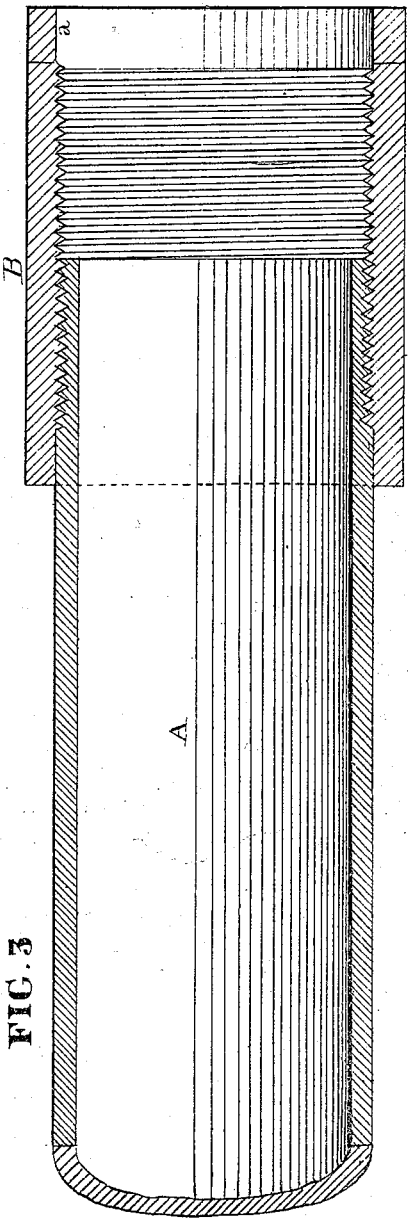

Figures 1 and 2 are end and side views of one end of a pipe, A, and a coupling, B. Fig. 3 is a longitudinal section of the same.

Like letters in all the figures indicate the same parts.

A is a portion of a pipe, and B a coupling connected therewith by means of male and female screw-threads, as seen in Fig. 3. In the ends of the coupling B outside of the screw-threads are enlargements $a\ a$, equal in diameter to the outer diameter of the pipes, so that when the pipes and coupling are screwed together these smooth enlargements hug the periphery of the pipes and take all lateral strain off the termination of the screw-threads, and thereby utilize the strength of the whole thickness of the metal of the pipes. In order to accommodate the enlargements $a\ a$ to inequalities in the diameter of the pipes, I make a series of slots, $b$, through the ends of the couplings, as seen more clearly in Figs. 1 and 2.

It will readily be seen that, in addition to the coupling of tubes, the invention is also applicable to coupling shafts and rods.

I claim as my invention—

The slots $b$ in the ends of the couplings B to accommodate the enlargements $a$ to inequalities of the surfaces of the pipes, in the manner above set forth.

JOSEPH CONNER.

Witnesses:
   THOMAS J. BEWLEY,
   STEPHEN USTICK.